E. J. LEYBURN.
Truck.
No. 222,412. Patented Dec. 9, 1879.
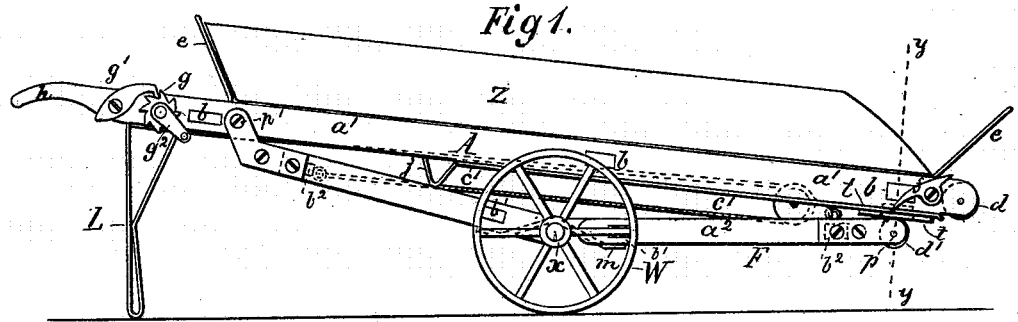
Fig 1.
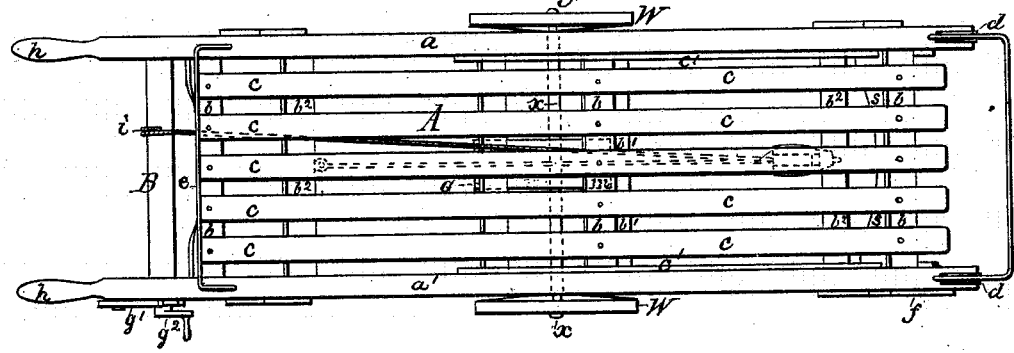
Fig 2.
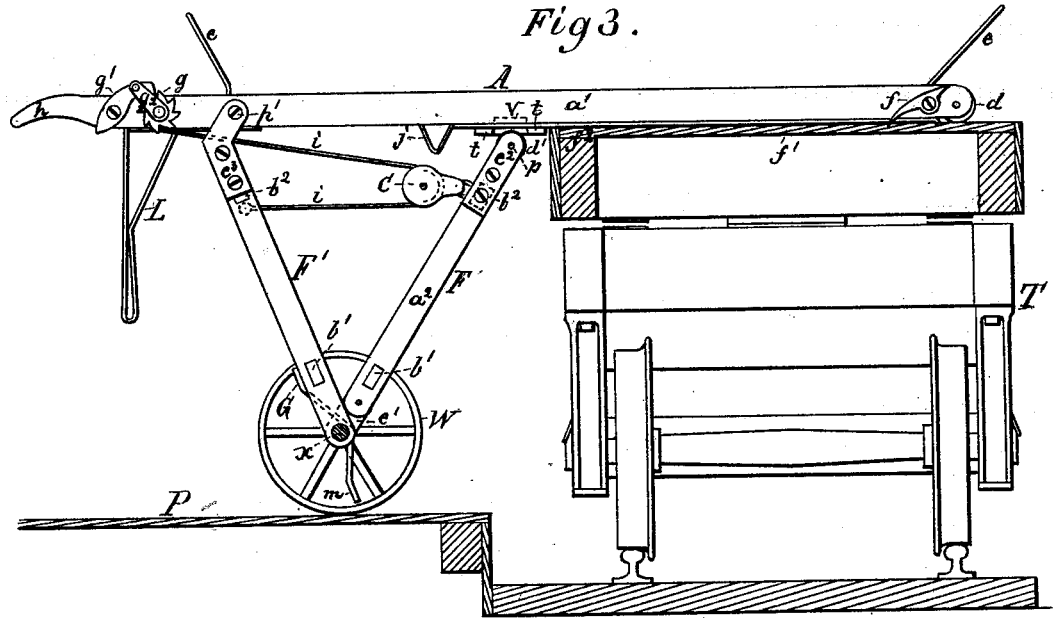
Fig 3.
Fig 4.
Witnesses:
J. P. Th. Lang.
J. Russell Bard
Inventor:
Edward J. Leyburn
by
Mason, Fenwick & Lawrence

UNITED STATES PATENT OFFICE.

EDWARD J. LEYBURN, OF LEXINGTON, ASSIGNOR OF ONE-HALF OF HIS RIGHT TO WILLIAM A. McCUE, OF STAUNTON, VIRGINIA.

IMPROVEMENT IN TRUCKS.

Specification forming part of Letters Patent No. 222,412, dated December 9, 1879; application filed October 23, 1879.

*To all whom it may concern:*

Be it known that I, EDWARD J. LEYBURN, of Lexington, in the county of Rockbridge and State of Virginia, have invented a new and Improved Truck for loading trunks upon railroad-cars and for carrying grain or other articles to be dumped; and I do hereby declare that the following is a full, clear, and exact description thereof, reference being had to the annexed drawings, and the letters of reference marked thereon, forming a part of this specification of said invention, in which drawings—

Figure 1 is a side elevation of my improved truck, with a hopper in place thereon for carrying grain or any article to be dumped. Fig. 2 is a plan view of my improved truck, the hopper shown in Fig. 1 being removed, and the truck in condition to have trunks placed and piled up crosswise thereon preparatory to elevating the same to the height of and upon the floor of a baggage-car. Fig. 3 is a side elevation of my improved truck as it will appear when in use for loading trunks into a railroad baggage-car, and ready to be withdrawn from the car after the trunks have been removed from the truck; and Fig. 4 is a cross-section in the line $y\ y$ of Fig. 1.

The nature of my invention consists in providing a truck with a platform which, while loaded with trunks or other articles, may be bodily elevated a considerable distance above its normal position over the axle and wheels of the truck, and yet have a support upon said axle and wheels, for the purpose of unloading the platform either into a railroad-car or upon a floor or on a plane which is higher than the floor or plane upon which the wheels of the truck stand during the act of unloading.

It also consists in certain constructions, combinations, and arrangement of parts, as hereinafter described and specifically claimed.

In the drawings, A indicates the platform of the truck. This platform is constructed with two longitudinal side pieces, $a$ and $a'$, which, at their rear ends, terminate in handles $h$, and at their extreme forward ends are provided with rollers or wheels $d$. The side piece $a'$, near its extreme front end, has a sharp-pointed pawl, $f$, which on being turned down, as in Fig. 3, will engage with the floor $f'$ of a railroad-car (shown in part in said figure) when the platform has been elevated and shoved forward into the car, as represented, and so prevent the truck from casually moving backward away from the car while the trunks or other articles upon the platform are being removed therefrom and stowed away in the car.

The side pieces $a\ a'$ are framed together by cross-ties $b\ b\ b$, upon which, at suitable distances apart, longitudinal metal strips $c$ are fastened, as indicated in Fig. 2, the same constituting a proper floor of the platform, across which trunks and other luggage are placed and piled up from end to end of the floor between metal guard-rods $e\ e$, provided at either end of the platform, as shown, when the platform A is loaded.

Near the handles $h$, and forward thereof, a roller, B, is secured between the side pieces $a\ a'$, and has its bearings through said pieces. To the axis of this roller a ratchet-wheel, $g$, and hand-crank $g^2$ are fastened, and so arranged in relation to a pawl, $g'$, on the side piece $a'$ of the platform that the pawl when thrown into position, as shown in the figures, will engage with the teeth of the ratchet-wheel.

Each of the side pieces $a$ and $a'$, near their rear ends, is provided with supports or legs L, which, when the truck is being loaded, may be made to stand on the same plane as the wheels W, as signified in Fig. 1.

To the under side of side pieces $a\ a'$ metal stops $j$ are driven into said side pieces, the office of which is to limit the rearward movement or throw of the frame F when said frame is drawn up from its position as shown in Fig. 1 to that shown in Fig. 3. From these stops $j$ forward to near the front end of the side pieces, $a$ and $a'$, metal plates $c'$ are applied to said side pieces. These guide-plates $c'$ are somewhat wider than the side pieces $a$ $a'$, and extend inwardly from said side pieces, as clearly shown in Fig. 4, for a purpose presently described.

F is a rectangular frame having two side pieces, $a^2$, framed together by cross-ties $b'$ and $b^2$, as indicated in the figures. This frame is about one-half the length of the platform A, and of a width slightly less than said platform.

The side pieces $a^2$ of the frame are, by a metal plate-extension, $e'$, hinged at one end to the axle $x$ of the two truck-wheels W, as shown, and at their opposite ends are provided with metal-plate extensions $e^2$, through which the pivotal pins $p$ of a cross-bar, R, pass. This pivoted cross-bar R has a face-plate, $s$, applied upon it, as shown in Fig. 4, and the plate is made with broad ends $t\ t$, which bear against the face of the metal plates $c'$ upon the under side of the side pieces $a\ a'$ of the platform A during the movement of the frame F from its position as shown in Fig. 1 to its position as shown in Fig. 3, and vice versa. Said plate $s$ is also made with lips, as at $v\ v$, (clearly shown in Fig. 4,) which overlap the inwardly-extended portions of the plate $c'$, applied to the under side of the longitudinal frame-pieces $a$ and $a'$ of the platform A, and thus, by means of the bearing of the ends $t\ t$ of the plate $s$ against the plates $c'$, and the bearing of the lips $v\ v$ upon said plates $c'$, the frame F is always held in working juxtaposition with the platform.

F' is a rear frame, composed of side pieces and cross-ties similar to F, and at its lower end articulates upon the axle $x$ by means of the axle being passed through holes in the ends of its side pieces, as shown, while at its upper end its side pieces are provided with angular metallic extensions $e^3$, as shown, whereby the frame is pivoted, as at $p'$ to the side pieces $a$ and $a'$ of the frame A.

Centrally of the length of the cross-tie $b'$ of the frame F, and to the under face of said tie, a broad, strong, metal support, G, is firmly fastened. This support is bent, as shown, so as to rest upon the axle $x$, while its free end, as at $m$, is adapted to abut against the under face of the lower cross-tie, $b'$, of the frame F, and thereby afford a strong support to the platform A when the platform is in its normal position (shown in Fig. 1) ready to be loaded.

C is a sheave-block attached to the cross-tie $b^2$ of the frame F, and through this sheave-block a rope, $i$, is passed, as shown, with one of its ends fastened to the upper cross-tie, $b^2$, of the frame F', and with its other end fastened to the crank-roller B, so that an operator by holding on to one of the handles $h$ with one hand can with his other hand turn the crank $g^2$ and wind the rope $i$ upon the roller B, thereby drawing the frames F and F' upwardly from their position shown in Fig. 1 to their position shown in Fig. 3, and correspondingly elevating the platform A, as indicated in the drawings. During this act the forward end of the frame F will travel rearwardly along the face of the metal plates $c'$ until such movement is arrested by the plate $s$ of the cross-bar R striking against the stops $j$.

When the ratchet and pawl $g\ g'$ are engaged, as shown, it is obvious that the platform A may be held at any desired height within the range of its highest and lowest elevation.

To load trunks into a railroad-car, we will suppose an attendant to press somewhat with his left hand on the handle $h$ of the side piece $a'$ of the platform A, the hopper Z being removed, as shown in Fig. 2. This act will tilt down the rear end of the truck, and, instead of being supported by the wheels W and the rollers $d'$, it will now be supported by the wheels W and legs L in the position shown in Fig. 1. Trunks are now loaded upon the platform A between the guards $e\ e$, and the truck is then shoved or wheeled along the platform P until the front end of the truck almost touches the side of the car T. The attendant now presses with one hand upon the handle $h$, as before, and with his other hand turns the crank $g^2$ until the forward end of the truck rises slightly above the floor $f'$ of the car, whereupon the truck is shoved forward just enough to allow the sharp-pointed pawl $f$ to catch into the floor of the car. The attendant now, still holding on to the handle $h$, resumes the turning of the crank, which act draws the frames F and F' nearer and nearer together until the platform A has reached a horizontal position and on a level with the floor $f'$ of the car, whereupon the truck is, with its load upon it, shoved into the car, as indicated in Fig. 3, in convenient position for unloading and stowing the luggage in the car.

In some instances I intend to have the wheels W somewhat farther forward than shown in the drawings, and the legs L shorter, so as to make the truck pitch somewhat back instead of forward, and also only use a single guard, $e$, at the rear of the truck, dispensing with the front one.

The winding power may be increased by putting gearing on the winding-drum B and having a pinion to work in it, and the handle of the crank $g^2$ should be made to shove in in any suitable manner, so as to be out of the way when the truck is moved in a crowd of people.

I claim—

1. A truck provided with elevating and supporting frames, which at one end are jointed to the axle of the truck, while at their opposite ends one of said frames is pivoted to the platform in rear of the axle, and the other attached to the platform by a sliding connection forward of the axle, whereby, when the platform is being elevated from its normal position over the axle and wheels, the axle and wheels will be drawn rearward beneath the platform and the platform projected forward of the axle and wheels, substantially as and for the purpose described.

2. A truck comprising a platform, A, with suitable guards, two frames, F F', jointed together, and one of them pivoted or hinged at one end, and the other capable of sliding, an axle, $x$, wheels W, rollers $d$ and $d'$, a windlass-roller, B, rope, $i$, and sheave-block C, substantially as and for the purpose described.

3. The combination of the guide-plates $c'$, lipped plate $s$, jointed frame F F', and stops $j$, substantially as and for the purpose described.

4. The pivoted hooks $f$, applied to the forward end of the platform A of the truck, substantially as and for the purpose described.

EDWARD J. LEYBURN.

In presence of—
 SIMON RAMSEY,
 CHARLES SAMUEL STANTON.